Figure 8:
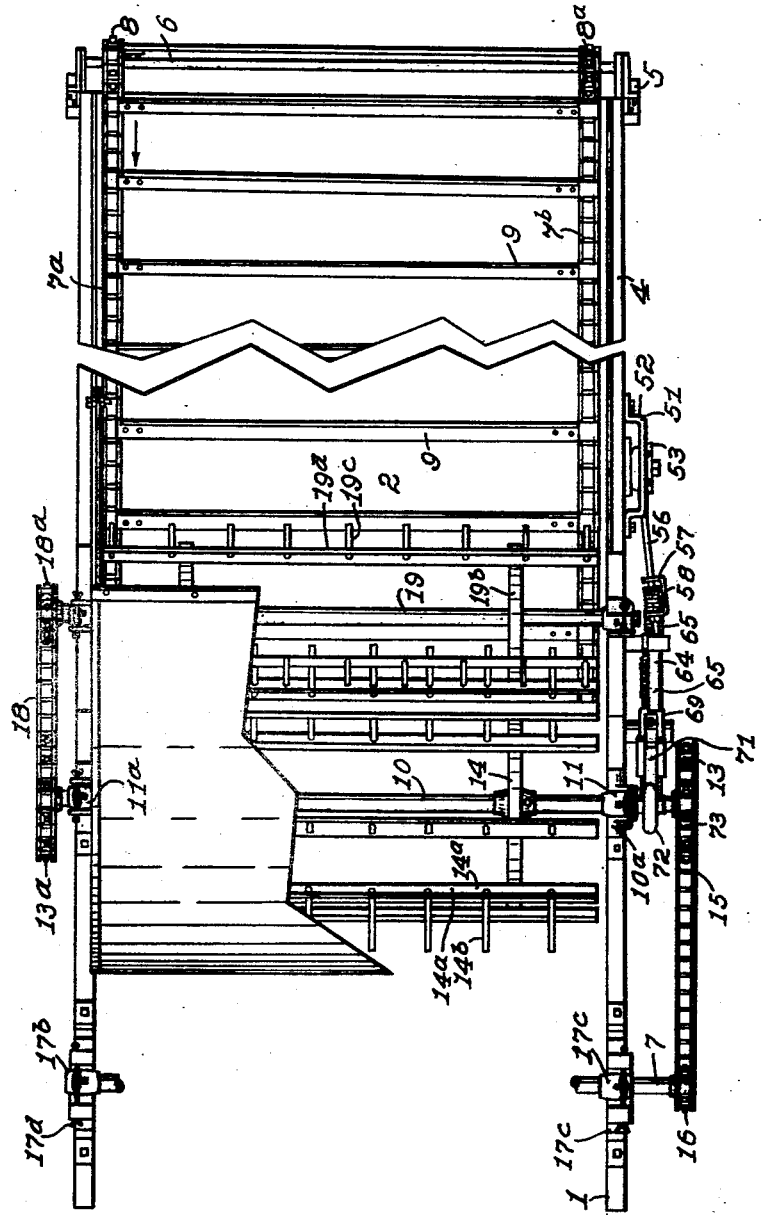

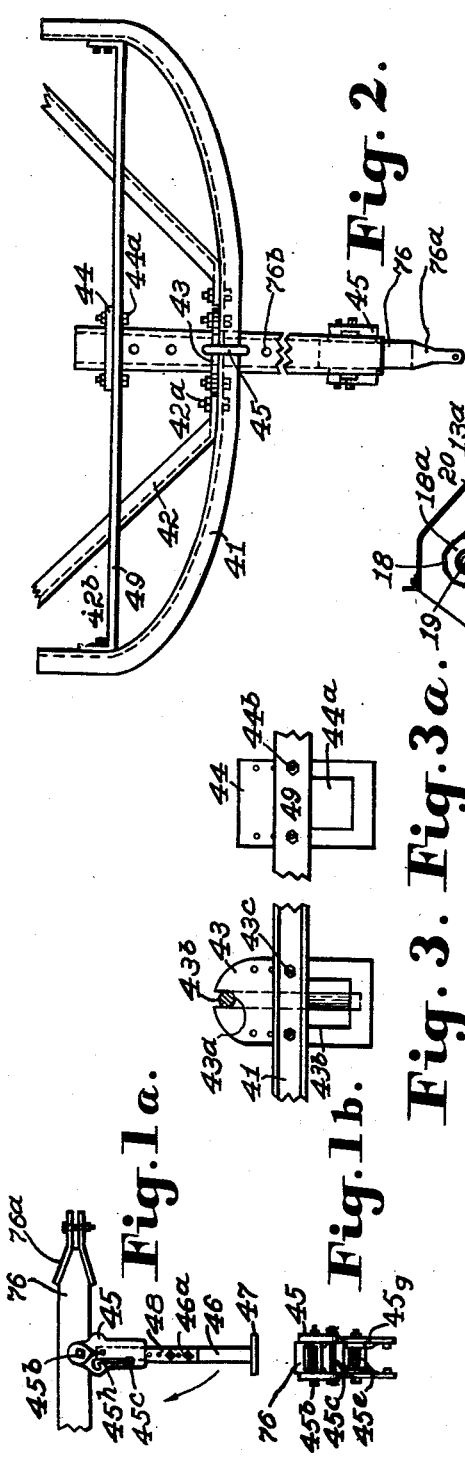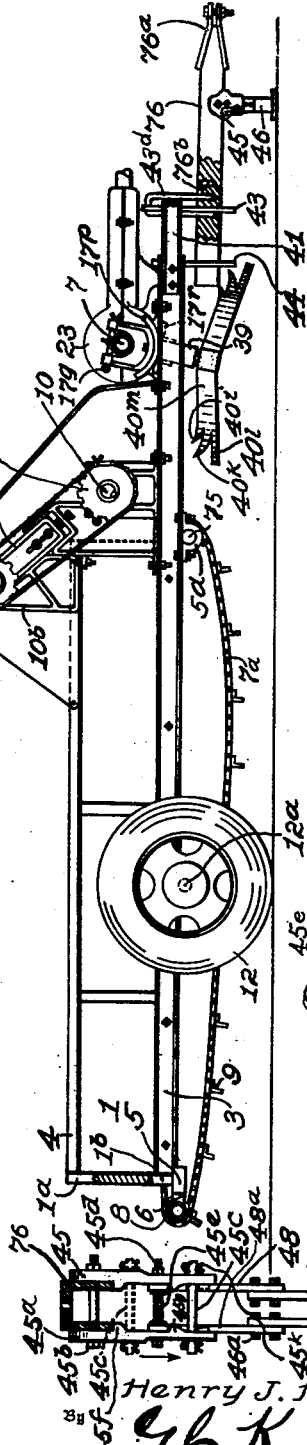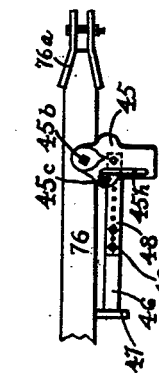

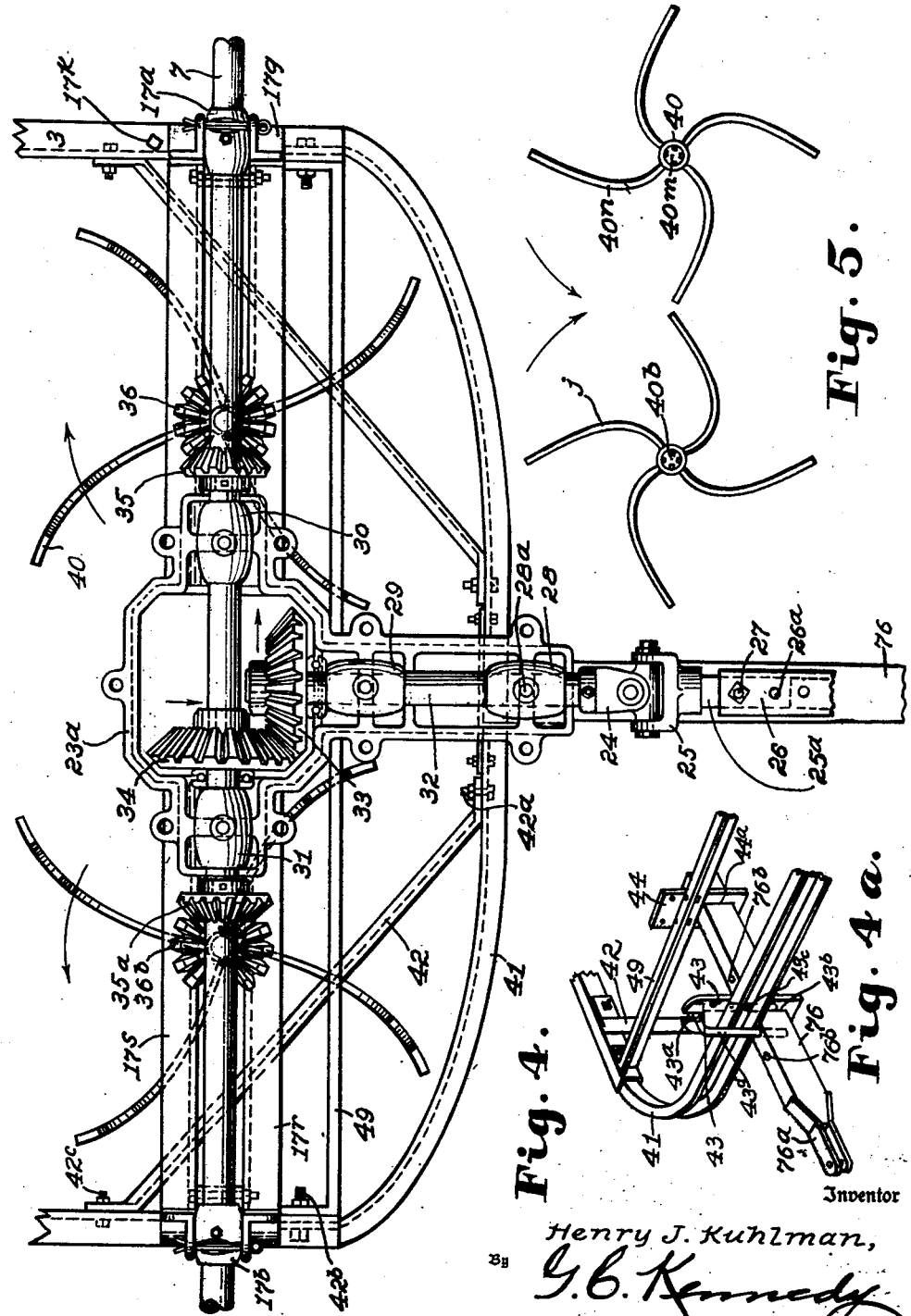

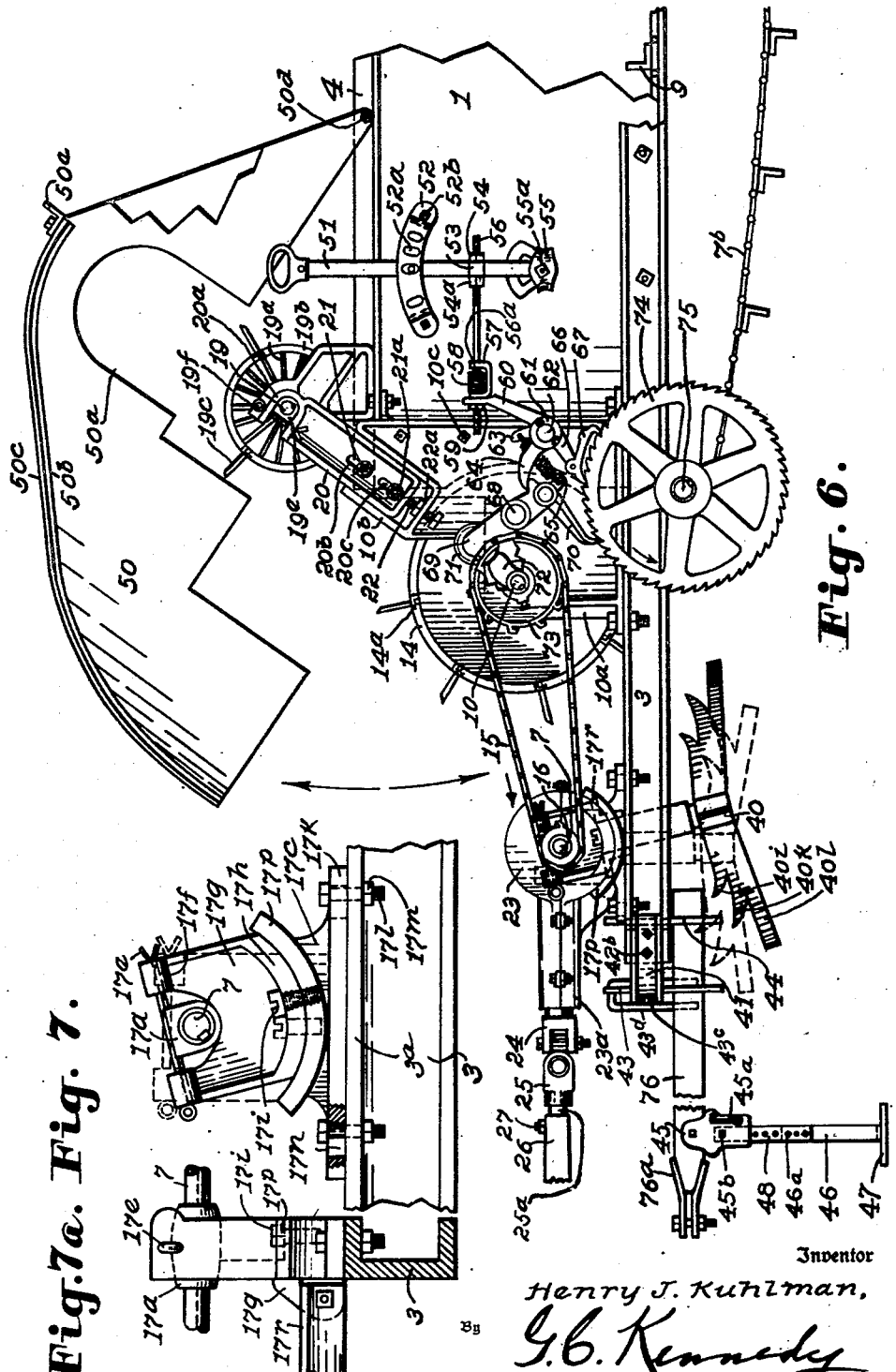

March 7, 1944.　　　H. J. KUHLMAN　　　2,343,303
FERTILIZER DISTRIBUTOR
Filed Feb. 24, 1941　　　6 Sheets-Sheet 4

Inventor
Henry J. Kuhlman,
By G. C. Kennedy
Attorney

March 7, 1944.    H. J. KUHLMAN    2,343,303
FERTILIZER DISTRIBUTOR
Filed Feb. 24, 1941    6 Sheets-Sheet 5
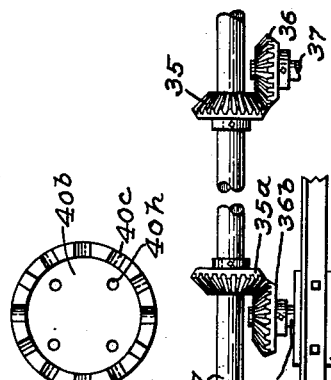
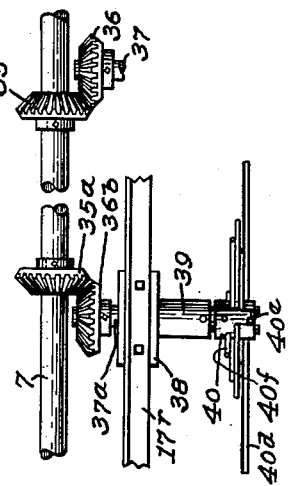
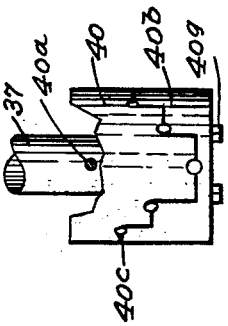
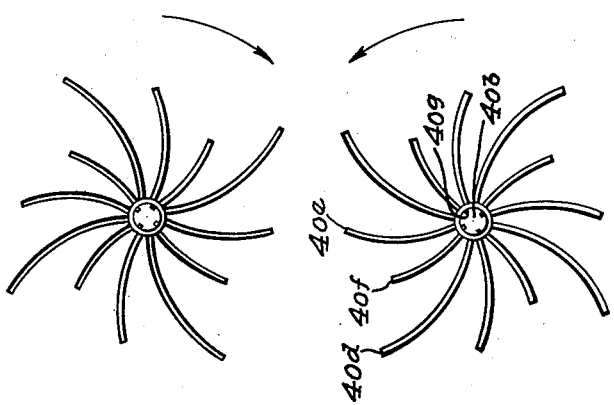
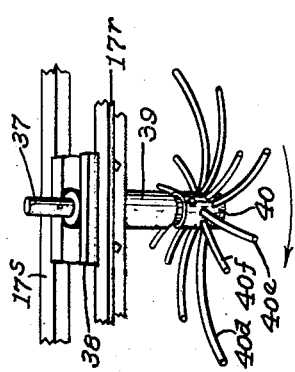
Inventor
Henry J. Kuhlman,
By G. C. Kennedy
Attorney March 7, 1944.  H. J. KUHLMAN  2,343,303
FERTILIZER DISTRIBUTOR
Filed Feb. 24, 1941  6 Sheets-Sheet 6

Inventor
Henry J. Kuhlman,
By G. H. Kennedy
Attorney

Patented Mar. 7, 1944

2,343,303

UNITED STATES PATENT OFFICE 2,343,303

FERTILIZER DISTRIBUTOR

Henry J. Kuhlman, Waterloo, Iowa

Application February 24, 1941, Serial No. 380,189

5 Claims. (Cl. 275—6)

My invention relates to improvements in fertilizer distributors, and particularly to transportable containers containing therein and thereon congeries of associated mechanisms for receiving and delivering fertilizers from the forward discharging devices thereof, including means for comminuting the material while in transit, and to deliver the treated material to other mechanisms forwardly upon laterally positioned rotors which in turn evenly spread the material outwardly laterally upon the soil.

I have accomplished the above by means of novel devices and combinations thereof, namely, a wagon box mounted upon a pair of carrying wheels positioned medially thereon, and a forward extension of the bottom wall of the box for supporting the comminuting devices thereon and also supporting the laterally distributing mechanisms for delivering the treated material laterally upon the ground.

Another object of my invention is to supply a longitudinally adjustable tongue extending forwardly from the said basal wall of the box and beneath it, and having a depending sectional foldable leg adapted to support the tongue and prevent the wagon box from tilting forwardly when it is not under draft.

Another object of my invention is to provide said forward extension of the basal wall of the box with a rigidly braced closure device adapted to support certain of the mechanisms thereupon, as well as laterally spaced adjustably depending rotary distributors supported thereon.

Another object of my invention is to supply suitable gearing and other means supported movably upon the said forward frame construction, whereby the rotary distributors may be rotated in opposite directions when in use.

Another object of my invention is to supply angle-gearing devices connected to a medially forwardly directed rotary shaft, and which latter has an adjustable universal joint connection to a shaft driven by a tractor or other actuating means ahead.

Another object of my invention is to supply an auxiliary rotary beater drum spaced above and rearwardly from the principal beater drum below, said auxiliary drum inclinedly movably supported upon the forward parts of the side walls of the wagon box, adjustably.

Another object of my invention is to support rotatably a ratchet wheel below the bottom wall of the wagon box at one side, with manually adjustable coacting spring-controlled coacting pawl devices operatively associated with and to rotate the lower beater drum, and the shaft of the latter at its opposite end having a sprocket wheel supplied with a driving chain mounted upon another sprocket wheel on the opposite end of the upper beater drum for rotating it also.

Another object of my invention is to supply a metallic canopy hingedly pivoted at its rear end upon the side walls of the wagon box to cover the said pair of beater drums, the canopy being shaped and contoured at its side walls and having opposite reentrant wall cavities whereby material ejected from said pair of beater drums may be prevented from escape therefrom when the beater drums are in action.

Another object of my invention is to supply the radiating arms of the rotary distributors with terminal integral tiers of outwardly and upwardly projecting pointed outer terminations and the arms being curved in one direction for widening the vertical extent of operations of the arms while in action, while the arms are in rotation.

Another object of my invention is the shaping of the radiating arms of the rotary distributors with parabolic curves.

Another object of my invention is the use of curvate arms mounted on the rotary distributor shafts and set in a single plane, the arms being of different lengths in congeries of three around the shaft.

Another object of my invention is the positions of the arms, whether straight or curvate in tiers, and mounted separably upon their respective shafts.

The above objects I have accomplished by the mechanisms which are hereinafter specifically described, claimed and illustrated in the accompanying drawings, and it will be understood that my invention includes variations in the elements thereof.

Figure 14:
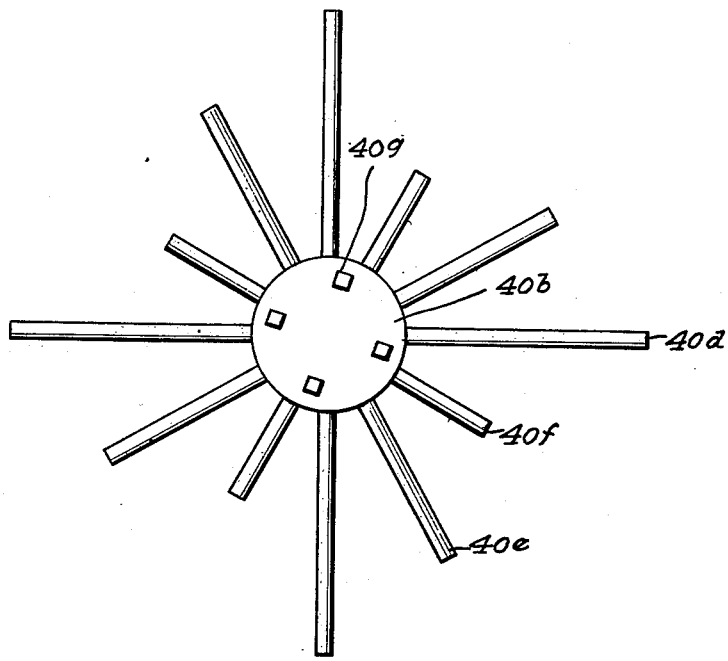
Figure 15:
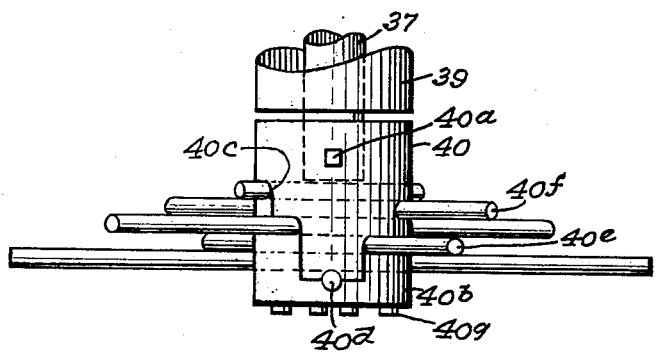

Fig. 1 is a side elevation of my improved fertilizer distributor. Fig. 1a is a detail side elevation of the forward part of the tongue with its jointed prop extended. Fig. 1b is a front elevation of the prop only, with the dotted lines showing it extended, and the full lines showing it collapsed. Fig. 1c is an enlarged front elevation of the prop as extended and with its upper section pivotally mounted on the tongue, the latter shown in cross section. Fig. 1d is a perspective view of prop parts only, and Fig. 1e is a side elevation of the collapsed prop. Fig. 2 is a top plan of the arcuate front cross member end-connected to the forward parts of the longitudinal channel bars whose forward parts are extended in advance of the wagon box, and including a cross-connection and angle braces, with the arcuate member also fixedly mounted across the medial draft bar and beam. Fig. 3 shows a medial portion of the arcuate member having an apertured plate mounted thereon and accompanied by an inverted U-shaped member. Fig. 3a is a second plate mounted on the cross-bar of the arcuate member. Fig. 4 is an enlarged top plan of the alined gearing devices and medial gear connection to the universal joint between the latter and a rotary broken away part of the drive shaft of a tractor. Fig. 4a is a perspective view of the tongue as associated with portions of the arcuate bar and its stay-bar. Fig. 5 is a bottom plan of oppositely rotatable depending stems of distributor devices showing like but relatively reversed radial arms thereon shaped in each with a parabolic curve. Fig. 6 is an enlarged side elevation of the pair of beater drums and their operating adjustable devices, with the associated means for propelling the endless carrying apron forwardly to discharge its loading upon the pair of rotary distributor devices, with other parts of the fertilizer distributor and its supports broken away or not shown. Fig. 7 is an enlarged side elevation of the adjustably rockable bearing device mounted transversely upon the side bars of the wagon body, with portions broken away. Fig. 7a is a cross section of one of the frame bars shown in Fig. 7, and of the transverse shaft bearing mounted thereacross. Fig. 8 is an enlarged top plan, with parts removed or broken away, showing the endless chain device for transporting a load forwardly, also showing the pair of beater drums and the adjustable manually operable adjusting devices adapted for varying the speed of rotation of the beater drums. Fig. 9 is a side perspective view of the supporting means and bearing for one of the depending rotary shafts which carry on its lower part curvate arms arranged in sets of different lengths of which the sets are relatively in their members spaced in an inclined arrangement. Fig. 10 is a bottom plan of the relatively reversely rotatable shafts and arms thereon as shown in said Fig. 9. Fig. 11 is a bottom plan of the lower end of the uppermost section of the supporting sleeve parts. Fig. 12 is an elevation of the gearing for rotating one of the distributor devices, with parts broken away. Fig. 13 is an enlarged elevation of the separably engaged pair of clamping elements, with an upper part of the uppermost element and of its shaft, broken away, and with the arms removed from their sockets. Fig. 14 is an enlarged bottom plan of the arm devices shown in Fig. 13, and the lower clamping means therefor, the arms in this view being straight. Fig. 15 is a side elevation, in the scale of said Fig. 14, showing the carrying clamping devices as separably clamping the devices together, and with other associated elements broken away.

Referring to said Figs. 1 and 6, Fig. 1 is a side elevation of my fertilizer distributor, while Fig. 6 is a side elevation of the forward opposite side elements thereof on a larger scale, with parts removed or broken away. In Fig. 1 is shown a wagon box 1, with side walls and with an open forward end, and having a floor. An angle-bar 4 is mounted along the upper outer wall of each side wall of the box, and a channel-bar 3 is mounted along the lower part of each side wall to project forwardly therefrom. As shown in Figs. 2, 4 and 4a, an arcuate channel-bar 41 has its terminations rearwardly bent and secured by bolts 42b to the forward end webs of the channel-bar. Oblique angle-bars 42 have their ends bent angularly inwardly and as braces are fastened terminally and angularly to and between the inner walls of the channel-bars 3 and medial inner walls of the arcuate member 41 by bolts 42c and 42a respectively, rigidly. A transverse stiffener bar 49 has angular rearwardly bent ends also secured (Fig. 4) by the same bolts 42b to the opposite channel bars 3. Also, in Fig. 4 is shown a pair of spaced parallel transverse bars 17r and 17s end-mounted rigidly across the channel bars 3 and carrying the terminal spaced angular brackets 17g, seating therebetween the longitudinal bearing-blocks 17b and 17a removably held by split-keys, which blocks are apertured in alinement and seating the end parts of a transverse rotary shaft 7. The blocks 17a and 17b have transverse grooves across their tops seating therein said split-keys to prevent turning of the blocks, and the latter have radial bores to admit oil to their bearings on the shaft 7.

Casing halves 23 and 23a have hollow side chambers traversed by the shaft 7, which casing projections seat therein non-rotatable bearing-blocks 30 and 31 traversed by the rotary shaft 7, and oppositely directed bevel pinions 35 and 35a are fixed on said shaft to rotate therewith. As shown in Figs. 1, 4, 6, 7, 7a, 9 and 12, bevel gears 36 and 36b are fixed on the upper ends of downwardly and rearwardly inclined shafts 37 and 37a and in mesh with the bevel gears 35 and 35a respectively. In Fig. 12 is shown, and also in Fig. 4, the spaced parallel transverse bars 17r and 17s whose end bearings 17a and 17b are traversed by the shaft 7, and the inclined shafts 37 and 37a depend through the interspace of said bars and (Fig. 9), in each case, and Fig. 12, an apertured bearing 39 secured at 38 to and between the angle-bars 17r and 17s, is traversed by the shafts 37 and 37a, in the lower ends whereof are (Fig. 13) secured a sleeve member 40, in each case, by a cross pin 40a.

In Fig. 6, a sleeve is fixed on each of the lower ends of the shafts 37 and 37a, carrying spaced radial outwardly downwardly forwardly inclined upwardly flattened arms, each arm being laterally curvate (Figs. 9 and 10) and having outwardly and upwardly inclined detents 40i and 40k stepped outwardly relative to each other, except that the longer outermost parts of the arms 40l may be squared or otherwise shaped. The dotted lines in Fig. 6 indicate the relative positions of said arms in an opposite stage of rotation.

In Fig. 4, a bevel gear 33 is in mesh with a coacting bevel gear 34 fixed on the transverse shaft 7 within the casing 23—23a, and the shaft 32 of said bevel gear 33 traverses a hollow forward end part of the casing 23—23a and having on its projecting end a fixed universal joint member 24 rockably pivoted to an abutting rockable pivoted part 25 which has a forwardly directed squared stem 25a traversing a squared bore in the incasing squared sleeve 26. The sleeve 26 has a plurality of longitudinally spaced bolt-holes 26a therethrough adapted to aline with any hole in the stem 25a, whereby a bolt and nut device 27 may connect the part 26 adjustably longitudinally to the squared part 25a.

In Figs. 1 and 6 a medial forwardly directed tongue 16, has a forward coupling device 16a, and has its rear part immediately below the forwardly curvate cross member 41, the tongue 16 having a plurality of vertical holes 16b spaced longitudinally therealong to receive adjustably the depending parts of an inverted U-shaped member 43b, and to permit of adjusting the tongue longitudinally relatively to the curvate member 41. A pair of longitudinally spaced plates 43 and 44 respectively are fixedly mounted medially on the members 41 and 49 (Fig. 4a), the forward member 43 having a medial top notch 43a and in its lower part a medial square opening 43b, with bolts 43c securing the plate to the bar 41, and as shown in Figs. 4a and 6, the tongue 76 traversing the hole 43b. The rectangular rear plate 44 of Fig. 3a is likewise bolted medially on the cross bar 49 with the tongue 76 traversing the rectangular hole 44a of said plate. As shown in Fig. 4a, the inverted U-shaped device 43d has its upper middle part seated removably in the notch 43a of the plate 43 with its depending limbs removably seated in certain of sockets 76b in the tongue 76 removably and adjustably, for varying the forward and back adjustments of the tongue.

Referring to Figs. 1, 1a, 1b, 1c, 1d, I have provided a prop member or device shown therein for supporting the tongue 76 horizontally, and collapsibly, as shown extended in Figs. 1, 1a, in a side elevation, also shown in an enlarged front elevation extended in Fig. 1c, in a side elevation in Fig. 6 extended, and as collapsed in Fig. 1b, and disassembled in Fig. 1d. Referring to Fig. 1c, like but spaced apart inwardly facing hangers 45 and 45a are embracing the outer walls of the downwardly channeled tongue 76 and secured removably thereto by a bolt 45b, the lower edges of the channel bar flanges supported on inwardly directed lugs 45f of the hangers. Other lugs 45g project inwardly oppositely from the hangers below the lugs 45f. An unheaded cross rod 45c loosely traverses the opposite vertical side slots 45h of hangers 45 and 45a, and have split-key stops 45k on their outer ends. A transverse bolt 45d supports thereon a coiled compression spring 45e and traverses the medial parts of the hangers 45 and 45a and secured by a nut. A laterally spaced pair of depending arms 48 have their upper ends between the said hangers loosely hung abutting them thereon, and the compression coiled spring 45e is mounted on the bolt 45d in end contacts with the upper ends of the arms 48. A rectangular U-bar 46 has a bottom plate 47 fixed thereon, and the upwardly directed U-bar ends are partly seated between and in contact with the lower inner faces of the arms 48 and connected thereto fixedly by short bolts 46a, removably. The depending arms 48, as shown in Fig. 6, have a plurality of bolt-holes therealong (Fig. 1a) to receive the bolts 46a adjustably as in Fig. 1a, to more or less extend the prop device when necessary. The hangers 45 and 45a have like opposite vertical slots 45h of inverted J-shape, and the transverse pin 45c may be drawn upwardly in these slots to be seated in the downturned parts of the slots (see Fig. 1d), to lock the legs 46 in raised position parallel with the tongue 76, as shown in Fig. 1e. Fig. 1b also shows the legs raised as seen from the front, and locking the legs parallel with and below the tongue, the coiled spring 45e holding the legs also in either position removably. In Figs. 1c and 1d, it will be seen that the inwardly directed oppositely spaced lugs 45g have convergent upper and lower bevels. When the leg parts 48 and 48a are swung upwardly as shown in Fig. 1, their upper end parts ride over the beveled ends of the lugs 45g to be held under spring tension on the upper bevels of the lugs to be supported as shown in Fig. 1e, and when the operator manually moves toward each other the upper parts of the legs while compressing the spring, the legs may be rocked downwardly to a vertical position, and, as in Fig. 1a releasably locked upright. In Fig. 1c the dotted lines show the upper position of the rod 45c as shown in said Fig. 1e.

Referring to Fig. 8, which is a plan of the bottom wall of the wagon box 1 having spaced side walls with open front and forwardly projecting skeleton prow as previously described, certain elements are omitted, Figs. 1 and 6 showing other features of well known use and construction, such as the single pair of carrying wheels 12—12a shown in Fig. 1, and partly external features such as the endless slatted apron shown in Fig. 8 as containing its component side chains 7a and 7b reeved on bracketed sprocket wheels 8 and 8a, and with longitudinally spaced anglebar connections also shown in said figure positioned in the wagon box with driving means shown in and on the wagon box for propelling the upper reach of the apron forwardly and as shown in said Fig. 8 to carry along the box and deliver to and upon a forward rotary beater drum 14 provided with outward spikes at 14a, material carried forward on the upper reach of the apron to and carried on the spikes around the drum forwardly for comminuting the material and then deliver it downwardly upon the pair of oppositely rotatable armed devices 40 below and ahead of the drum for dissemination upon the soil below.

A smaller beater drum 19b with external spikes 19c has an axial shaft 19 removably positioned in the upper end parts 19e and a seat element 20a, and held therein by a split-key 19f. Integral with a forwardly sloping member 20, hollow and having a pair of inclined slots 20b and 20c with securing bolts 21 and 21a to hold it adjustably upon a fixed supporting member 10b, an adjusting screw 22 traverses a cross member of the part 10b and held adjustingly thereto by nut 22a. The upper and rearmost smaller drum 19b rotates by use of a short endless chain 18 and a sprocket wheel 18a on the transverse shaft 19 supported in bearings on the wagon box side walls. The rotary shaft 19 has a like sprocket wheel 13a which carries the forward part of said chain 18, and whereby the rear beater drum 19b is rotated to deliver any of the traveling material which might otherwise escape from said drum, in delivering the material upon the lower drum. The drums have respectively supporting end parts 11 and 11a. The supporting side members 10b are bolted at 10c to the inner walls of the wagon box.

Referring to Figs. 6 and 8, the opposite end of the lower beater drum shaft 19 carries a sprocket wheel 73, with the rear end part of a chain 15 reeved thereon and having the forward end of the chain reeved around the smaller ratchet wheel 16 on the forward shaft 7, hereinbefore mentioned as rotating the gears 35 and 35a shown in Fig. 12, and in turn the angle-gears 36 and 36b as also the depending shafts 37 and 37a which carry the radial distributing arms at their lower ends. The shaft 75 is mounted in bearings 5a on and below the frame 3, and carries thereon the forward loops of the chains 7a and 7b about the sprockets on the shaft. The rear end loops of the chains 7a and 7b are carried about the bracketed rear sprockets 8 and 8a.

In Fig. 6 are shown the adjustable relative connecting devices for rotating the ratchet wheel 74 mounted on shaft 75, forwardly, by a step by step movement. On a forward side part of the wagon box 1 a vertically disposed hand-lever 51 is pivotally mounted in a bearing bracket 55 on a pin with nut 55a. An upwardly curved offset member 52 has its end parts secured to the said side part of the wagon box by bolts 52b. The hand-lever 51 has resiliency and has an outwardly projecting pin on its outer face midway thereon and adapted to yieldingly enter any of oblate apertures 52a ranged along the lever. A horizontal rod 56 has its rear end traversing threaded seats in the projection 53 on the lower outer face of the lever, and the rod carries adjustable nuts 54 and 54a abuting the projection. The forward end of said rod is also threaded to receive a nut 59 as an adjustable abutment and spaced from the forward part of a U-shaped member 57 whose limbs are apertured to seat the rod 56 therein, and a coiled spring 58 is mounted on the rod between its members. On a pintle 62 on the wall member 10a is a rockably seated sleeve 61 having an upwardly projecting bent arm 60 terminally apertured to seat loosely on the forward part of the rod 56 and between the U-shaped member 57 and the nut 59, adjustably. On the sleeve 61, to the left of the arm 60, are other arms 63, 64 and 66, the arm 66 having its outer end pivoted to a doubly ratcheted pawl 67 adapted to engage the detents of the ratchet wheel 74 adjustably to move the wheel 74 ahead to the extent of either one, two or three detents, according to either of said three adjustments shown in Fig. 6 at 52a in the bracket 52. The single forward aperture in the bracket is to seat the stud on the arm 51 therein when the arm is swung forwardly to actuate the sleeve 61 to swing up the roller 71 and away from the radial member 72 fixed on the forward beater drum shaft 10. The numeral 68 denotes a bearing stud on the wall member 10a having oppositely projecting arms, the uppermost arm at 69 carrying a circumferentially grooved roller 71 shaped to ride at times upon the rounded rim part of said cam body 72. The opposite arm has near its upper rear edge a stop with which the curvate terminus of the arm 63 is movably engaged by action of the coiled spring 58. A coiled tension spring 65 is engaged between a lug 63 on the sleeve 61, the opposite end of the spring being connected to a short stud on the member 69. An arm 70 projects forwardly inclinedly from the lower end part of the rock member 69 and has a downwardly directed curvate end to ride upon teeth of the ratchet wheel 74 under compulsion of the spring 65. In the train of devices between the lever arm 51, the rock arms 69, roller 71 and detent arm 70, as shown in Fig. 6, the arm or lever 51 is upright and engaged with the bracket 52 in a position for the operation of yieldably meshing with the teeth of the ratchet wheel 74 to permit the latter to rotate to the extent of travel of one tooth. The others of the apertures 52a of the bracket are to be used in seating the detent of the arm 51 therein, thus adjusting the travel of the wheel 74 to move around to the extent of travel of two or three teeth as desired. When the peripherally grooved roller 71 is actuated by the connections thereof with the lever 51, either of three adjustments of movement of the detent arm in engagement with the teeth of the ratchet wheel may be obtained, in rotating also the beater drum 14, and concurrently the gearing and depending shafts of the beater arms therewith. A housing 23, 23a may be provided as shown in either Figs. 1 and 6 for inclosing in part the gearings as shown in Fig. 4.

In Figs. 1, 7 and 7a are shown, in respectively side and rear elevations, the adjusting means for varying the inclinations of the shafts 37 and 37a which carry the radial arms for distributing comminuted or other kinds of materials upon the ground adjacent the sides of the wagon box.

Referring to Figs. 7–7a, and Fig. 4, the latter showing the angle gears for rotating the driving shafts 7, also the hingedly coupled tractor shaft. In Fig. 7 is shown one of a pair of basal members 17k having near each end thereof a short longitudinal slot 17n, and showing headed bolts 17l traversing the slots and also traversing holes in an upper flange 3a of one of the channel bars 3, with securing nuts 17m on the bolts below the said flange, for permitting a longitudinal adjustment of the bolts in the basal member. The numeral 17c denotes a rigid connection between the member 17k and an upwardly hollowed arcuate bearing part 17p. The numeral 17g denotes a planar member whose lower end part 17h is rockably fitted in and upon the upper hollowed member 17p, the upper edge of the member 17g being medially hollowed curvilinearly to seat therein a shoe 17a, curved at the bottom to be adjustably rocked therein and centrally apertured to seat rotatably one end of the shaft 7 having a key securing a sleeve to the shaft as a bearing device for the sleeve in the member 17a. At the upper opposite corners of the plate part 17g are alined rigid sleeve bearings 17f, longitudinally apertured to seat therethrough the split pins 17e. In the lower curvate member 17p are interiorly threaded bores, a pair only being indicated, either of which bores may receive a threaded fitting screw 17i, permitting adjustable tilting of the member 17h to and fro to likewise adjustably tilt one of the depending rotary shafts as shown in Figs. 1 and 6. The dotted lines of Fig. 7 indicate the opposite tilting while rotating of the shaft 37. This tilting of the shaft adjustably rearwardly to practically a horizontal position to the rear, permits the rapidly rotating arms 40 to adjustably tiltably direct material delivered thereupon from the beater drum 14 upon the arms in the rear and directing the material outwardly from the arms at a desired angle upon the soil alongside and somewhat forwardly upon the ground alongside. Fig. 7a at 17r indicates part of a transverse beam support.

In Figs. 1, 5, 6 and 9 to 15 inclusive, the rotary delivery devices for propelling material from the arms thereof are illustrated in variations of structures and within the scope of my invention herein.

In Fig. 6, also Fig. 1, the rotary delivery arms of the rotors are of different lengths of spurs are tilted downwardly, and are similar in shape and function. The arms are flattened vertically with outer terminations curvilinearly upwardly dentated and slightly hollowed at their advancing faces, the arms having their detents stepped inclinedly toward the supporting shaft, thus widening the vertical scope thereof in propelling outwardly the material to be delivered between the arms radially and in also increasing their zone of action in distribution of the material upon the ground surface alongside.

In Fig. 5, the radial arms j and 40n are devoid of spurs, are semi-parabolic longitudinally. The inner parts of the arms therefore are all curved in the same direction from their axis members with their curvature lessening outwardly to terminate in planer end parts in one rotor on the shaft 40b, and the other rotor on the shaft 40m being like the rotor beside it but having its parabolic arms 40n oppositely directed. This parabolic shape of each arm is such, that material delivered is when received on the parabolic curve part of the arm held together until it slides outwardly along the outer straight part of the arm while acquiring speed of delivery with a minimum of frictional resistance while being delivered along and from the flat surface of the arm, and to thus propel the material farther outwardly than when the arm is curved along its total length.

In Fig. 9, and Fig. 10, the rotary shaft 37 is seated in a sleeve 39, and spaced below this carries, and as shown without arms in Fig. 13, has an enlarged depending part 40, whose lower end is shaped in succeeding series of laterally oppositely inclined steps, the part 40 being secured on the shaft 37 by through pins 40a, removably. In Figs. 9, 12, 14 and 15 the arms are either straight or reversely curved, and as shown traverse holes in stepped relation through the stem 37 and also through stepped fitting parts, whereby when a lower closure cap such as shown in Fig. 13 has arm fitting holes 40c at their fitting edges, with the arms traversing and locked removably at 40a in the pairs of semi-holes (see Figs. 14 and 15), by the fitting stepped cap member 40b and screws 40g, and whereby the stepped series of arms trap and deliver material falling upon them and between them, to propel the material to a distance radially.

As the radiating arms are in series of three around the shaft 37, and stepped in such tiers relative to each other, the varying successively shortening of each such set cause the arms to successively in different zones whip through the air to propel all of the material outwardly radially and evenly upon the ground. As shown in Fig. 10, the curvate arms of different lengths may all lie in one zone of movement. Fig. 11 is a top plan of the stepped cap 40b (without traversing arms).

In Fig. 12, the rotary shaft 7, broken away medially, has a spaced pair of angle-gears at 35—36, and at 35a and 36b, the gears 36 and 36a secured to the depending shafts being each rotatably seated in a bearing member 38 having a sleeve 39 depending rigidly therefrom and also traversed by the shaft, and carrying the engaged fixed and removable members at 40 having the tiers of these members fixed therearound.

I have shown in Figs. 6 and 1 a tiltable canopy 50 having like spaced side walls and a forwardly sloping front wall 50b—50c which terminates at the top medially and rearwardly at an angle-bar 50e fixed transversely thereon. The side walls 50 thence are sloped downwardly at their rear edges spaced apart, and at the end angles thereof pivoted on bolts with nuts 50d to the upper angle-bars 4 to the rear of the beater drums 14 and 14b while adapted to cover said drums when closed. This closed canopy forwardly at 50b-c prevents scattering the material forwardly and upwardly over the drums. The side walls 50 are aperturated alike oppositely medially at 50a, the forward depending side walls below the aperture 50a being stepped downwardly forwardly, and the forward parts of the side walls depending below the rear open part of the canopy. The approximately parallel top part 50c serves to repel downwardly any flying parts of the fertilizer to be re-deposited on the drums, and the canopy is self-cleaning, preventing building of layers of the fertilizer thereon.

I claim:

1. In combination, in a fertilizer distributor, a wagon box mounted on and between a medial pair of wheels without the box, the box being open in front and rear and having a floor and side walls, the front end of the box having a horizontal forwardly projecting open prow, an endless traveling apron mounted longitudinally around the box floor, a forwardly rotatable beater drum having radially directed spikes distributed therearound outwardly, the drum being in advance of the forward end of the traveling apron to receive material therefrom and comminute it while delivering it forwardly and downwardly through the open prow, transversely spaced adjustably rearwardly tilted oppositely rotatable depending shafts having seating radial members on and therearound on their lower ends, with their upper ends rotatably mounted on the prow, a medially forwardly projecting rotary shaft composed of sections connected by a universal joint, and movable rotary connecting devices between the rear section thereof and the upper parts of the depending shafts respectively and separately, to rotate the latter and independently scatter the material from the forward parts of the seating members in opposite directions laterally from them upon the ground alongside.

2. In combination, in a fertilizer districutor, a wagon box mounted for transportation, and having side walls and open ends, also a forwardly projecting aperturated prow on the forward part of the wagon box, a transverse forwardly rotatable shaft mounted on and across said prow, forward power-driven mechanisms adapted to rotate the shaft and adjustable means mounted on the prow for to and fro adjustments including seating of the shaft ends rotatably therein, pairs of angle gearings spaced apart and with outwardly facing toothed members thereof fixed on the shafts, other pairs of angle gearings below said shafts and meshed with said first angle gearings and having rearwardly tilted radially armed shafts, a forwardly rotatable beater drum mounted on the prow, an endless apron on the wagon box, forwardly movable, and adapted to deliver fertilizer material upon the beater drum, the beater drum being positioned to receive and deliver the material disintegrated thereupon downwardly upon the rear parts of the arms of said shafts terminally while the latter are in rotation oppositely, sprocket gears mounted on the upper ends of the transverse forwardly rotatable shaft, sprocket gears of longer diameter mounted on the ends of the beater drum, sprocket-chains reeved upon the said forward gears and the beater drum gears with their upper reaches movable forwardly, and manually adjustable linked and spring-controlled devices mounted upon the wagon box and its prow, adapted at times to releasably control the speed of said drum and of said apron.

3. In combination, in a fertilizer distributor, an open ended wagon box including a fixed prow mounted for transportation on a medial pair of traveling wheels, a forwardly rotatable beater drum with peripheral outwardly extending radial pins and mounted on the prow, the drum including an outwardly directed axial shaft, with terminal sprocket wheels, laterally separated rearwardly depending oppositely rotatable shafts mounted on the prow and adjustably tilted rearwardly and having radial distributor arms mounted on their lower ends to receive comminuted material deposited by the drum on the rearward parts of the arms while in rotation, to scatter the material laterally outwardly oppositely upon the ground at both sides of the prow, a rotatable shaft mounted across the prow to rotate forwardly, means to rotate said shaft, said shaft having sprocket wheels fixed on their outer end parts, linked chains reeved about the drum sprocket wheels and the last-mentioned shaft sprocket wheels at each side, and means for delivering the material to be comminuted to and upon the beater drum.

4. In combination, in a fertilizer distributor, a wheeled wagon box with open ends, an endless apron device mounted longitudinally around the floor of the wagon box with its upper reach movable forwardly, a beater drum supported on the forward end of the wagon box to rotate forwardly and deliver material therefrom forwardly and downwardly, means on the wagon box structure adapted to receive the delivered material and distribute it upon the ground at opposite sides of the wagon box, consisting of oppositely rotatable medially spaced rearwardly adjustably tilted shafts supported in a forward projection of the wagon box floor, the shafts having on their lower ends and therearound forwardly tilted distributing arms adapted to receive on the rearwardly directed rotary arms tilted upwardly and on the rearward parts of the arms the delivered material, to be oppositely distributed laterally upon the ground, a medial forwardly directed driving shaft forwardly rotatably mounted on the wagon box frame forwardly from and having separated sets of connected means between the spaced tilted shafts and the driving shaft, the driving shaft being sectional and provided with a universal joint forwardly with the forward end of the rearward joint member having a relatively short squared termination adapted to be adjustably secured removably to and sleeved within a hollowed seat in the rearward end of the forward joint member.

5. In combination in a fertilizer distributor, a wagon box with open ends and mounted for transportation, a beater drum mounted for forward rotation on the forward end of the wagon box, another beater drum adjustably positioned above and to the rear of the first beater drum to rotate forwardly, rearwardly tilted U-shaped brackets fixed on the forward part of the wagon box, slide members seated within the brackets and longitudinally adjustably mounted therein, the slide members having open seats on their upper ends with the axle ends of the second drum removably mounted in said seats, and means driven by the first drum associated with and adapted to rotate the upper beater drum.

HENRY J. KUHLMAN.